G. E. PARKS.
SPRING SUSPENSION FOR RAILWAY TRUCKS.
APPLICATION FILED JULY 10, 1916.
1,239,211.                                      Patented Sept. 4, 1917.
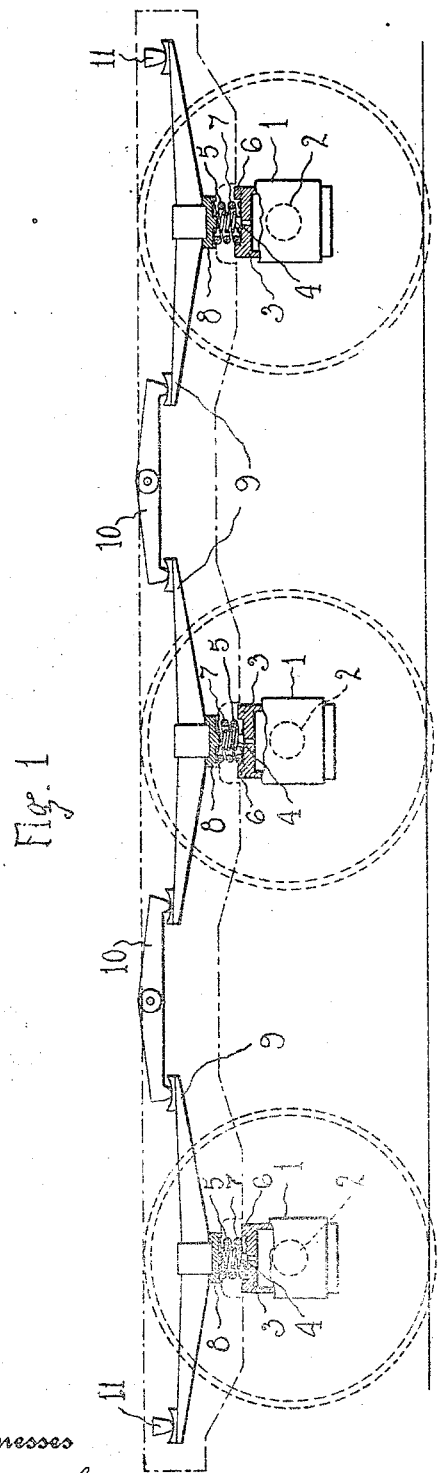
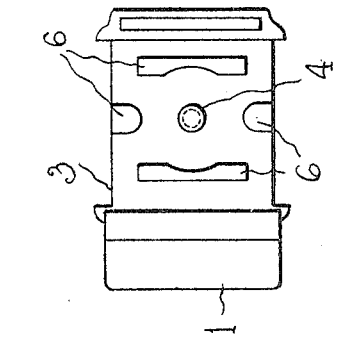
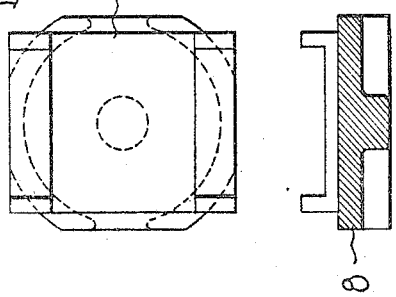
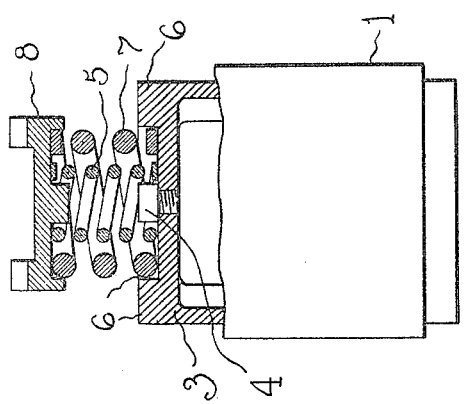
Inventor
George E. Parks

UNITED STATES PATENT OFFICE.

GEORGE E. PARKS, OF DETROIT, MICHIGAN.

SPRING SUSPENSION FOR RAILWAY-TRUCKS.

1,239,211.  Specification of Letters Patent.  Patented Sept. 4, 1917.

Application filed July 10, 1916. Serial No. 108,300.

*To all whom it may concern:*

Be it known that I, GEORGE E. PARKS, a citizen of the United States of America, residing at Detroit, in the county of Wayne and State of Michigan, have invented certain new and useful Improvements in Spring Suspension for Railway-Trucks, of which the following is a specification, reference being had therein to the accompanying drawings.

In the operation of railway coaches, the running gear is subjected to minor vibrations and oscillations due to slight inequalities in the rail and roadbed, which are, in the ordinary construction of trucks, communicated directly to the springs that carry the trucks on the journal boxes. As these springs are in themselves of considerable weight and must of necessity be sufficient to withstand the heavier oscillations to which the car is subjected, these minor vibrations are frequently communicated through the comparatively stiff springs directly to the truck body and consequently to the car.

This invention relates to spring suspension for railway trucks and to an arrangement thereof whereby the minor vibrations only affect the wheels and their boxes, without being communicated to the springs that carry the truck body and maintain it against the heavier shocks to which it is subjected.

The invention consists in the matters hereinafter set forth, and more particularly pointed out in the appended claim.

In the drawings,

Figure 1 is a view in side elevation of a spring suspension arranged on a truck that is shown diagrammatically, embodying features of the invention;

Fig. 2 is a view in detail of a journal box and spring;

Figs. 3 and 4 are views in detail of an equalizer spring seat, and

Fig. 5 is a view in detail of a journal box spring seat cap.

As herein shown, a journal box 1 for each axle 2 of a truck of usual type, has a spring seat cap 3 that is provided with a central boss 4 for maintaining or keeping an inner coil spring 5, and with outer lugs 6 that act as keepers for an outer spring helix 7. A suitable spring seat or perch 8 is carried by this compound assembled spring having the inner helix 5 and outer helix 7, on which rests a semi-elliptic spring of ordinary leaf type indicated at 9. The truck is mounted on these springs in conventional manner, with equalizer members 10 and bearing members 11.

As a result of this construction, any minor shock which is transmitted to the wheel and is sufficient to displace the latter vertically is only carried through the wheel and journal and box to the auxiliary springs 5 and 7 by which it is absorbed without tending in any way to affect the main riding springs 9, as the latter are comparatively rigid, due to the friction between the plates or elements of the springs. Thus the slight tremors which would otherwise reach the truck body and consequently the car, are absorbed. One of the features is the ready absorption of slight vibration as the comparatively slight mass of the car wheel and journal and box which would tend to displace the wheel and concomitant parts results in movements which are at once absorbed by the spring without being communicated to the main spring element. Therefore the car body is free from a great many deleterious tremors and vibrations which would otherwise reach it. As the auxiliary springs are beneath the main springs, the mass of the main springs and their equalizing parts is not disturbed or added to the wheel mass to be affected by the vibrations.

Obviously, changes in the details of construction may be made without departing from the spirit of my invention and I do not care to limit myself to any particular form or arrangement of parts.

What I claim is:—

In a car truck, journal boxes having the upper faces thereof provided with seats, concentric springs on the seats of said journal boxes, caps on said springs, main springs having central portions seated on said caps, and equalizing members between said main springs and pivotally connected to said car truck and having the ends thereof bearing on the ends of said main springs, and bearing members engaging the outer ends of the endmost main springs and supporting said truck.

In testimony whereof I affix my signature in presence of two witnesses.

GEORGE E. PARKS.

Witnesses:
ANNA M. DORR,
CHAS. W. STAUFFIGER.